United States Patent [19]

Kao

[11] Patent Number: 4,937,844

[45] Date of Patent: Jun. 26, 1990

[54] MODEM WITH DATA COMPRESSION SELECTED CONSTELLATION

[75] Inventor: Ming-Luh Kao, Miami, Fla.

[73] Assignee: Racal Data Communications Inc., Sunrise, Fla.

[21] Appl. No.: 269,812

[22] Filed: Nov. 3, 1988

[51] Int. Cl.$^5$ .............................................. H04B 1/66
[52] U.S. Cl. ...................................... 375/122; 375/39; 375/58
[58] Field of Search ................ 375/39, 122, 42, 58, 375/8; 371/43–45; 370/84, 118

[56] References Cited

U.S. PATENT DOCUMENTS

| | | | |
|---|---|---|---|
| 3,237,170 | 2/1966 | Blasbalg et al. | 340/172.5 |
| 3,506,961 | 4/1970 | Abramson et al. | 371/40 |
| 3,875,344 | 4/1975 | Bogart | 340/347 DD |
| 3,955,141 | 5/1976 | Lyon et al. | 375/42 |
| 4,047,151 | 9/1977 | Rybeck et al. | 340/146.1 |
| 4,237,552 | 12/1980 | Aikoh et al. | 370/118 |
| 4,517,596 | 5/1985 | Suzuki | 358/13 |
| 4,519,073 | 5/1985 | Bertocci et al. | 370/118 |
| 4,560,976 | 12/1985 | Finn | 340/347 DD |
| 4,612,532 | 9/1986 | Bacon et al. | 340/347 DD |
| 4,646,061 | 2/1987 | Bledsoe | 340/347 DD |
| 4,701,923 | 10/1987 | Fukasawa et al. | 371/41 |
| 4,706,265 | 11/1987 | Furukawa | 375/122 |
| 4,748,638 | 5/1988 | Friedman et al. | 375/8 |
| 4,756,007 | 7/1988 | Qureshi et al. | 370/84 |
| 4,758,899 | 7/1988 | Tsukiyama | 360/8 |
| 4,780,883 | 10/1988 | O'Connor et al. | 375/7 |
| 4,802,222 | 1/1989 | Weaver | 375/122 |

Primary Examiner—Benedict V. Safourek
Assistant Examiner—Tesfaldet Bocure
Attorney, Agent, or Firm—Jerry A. Miller

[57] ABSTRACT

A data modem includes a data compression circuit which compresses incoming data prior to transmission. The compression ratio obtained from the compression process is used to select a constellation for transmission of the data. When higher compression rates are achieved, fewer constellation points (symbols) representing fewer bits per point are transmitted. In this manner, incoming data rate can be held constant while utilizing a more robust constellation which has greater immunity to transmission line impairments. This reduces errors and retransmissions which can ultimately lead to reduction in effective throughput in conventional systems.

18 Claims, 4 Drawing Sheets

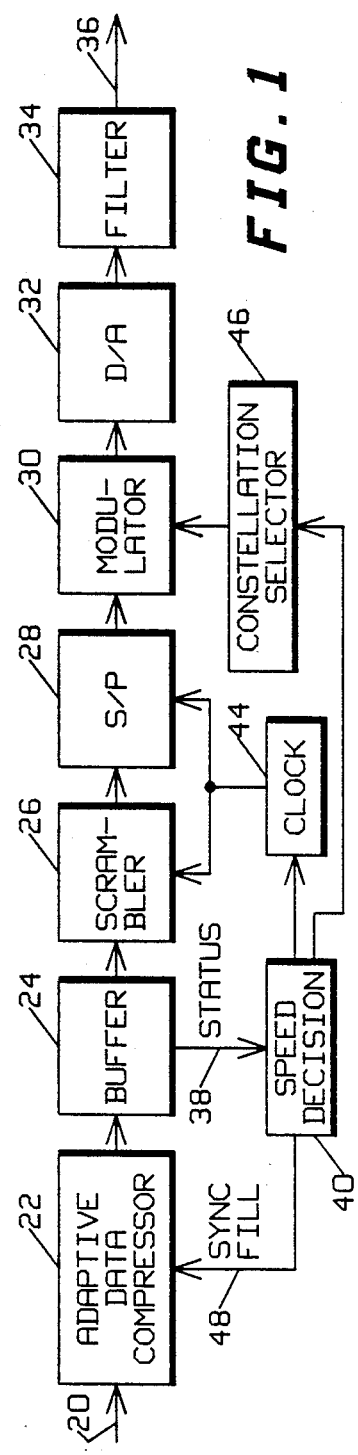
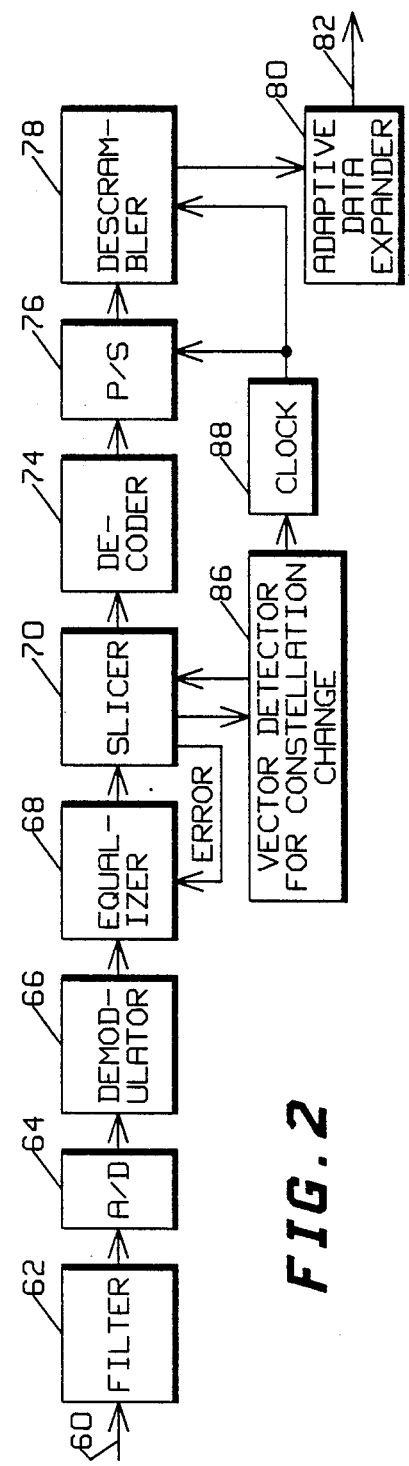

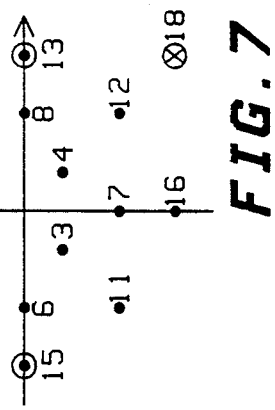
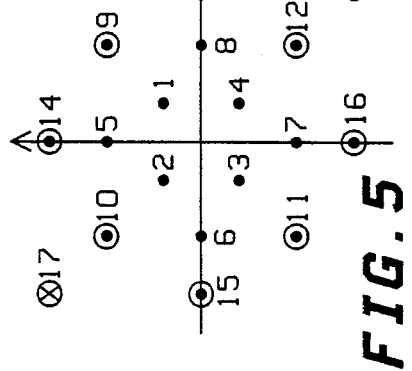
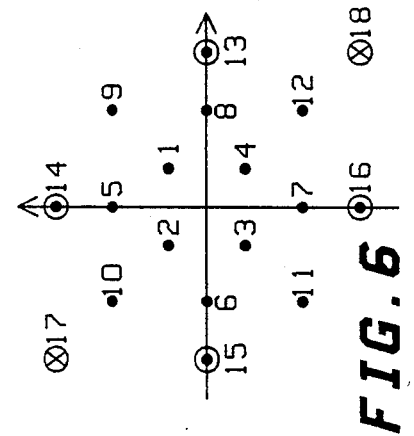
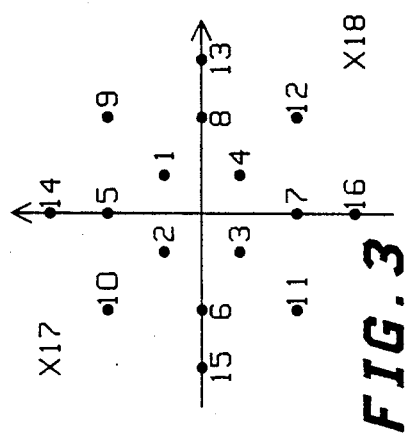
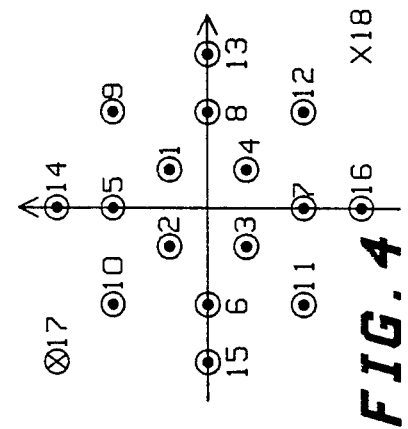

MODEM WITH DATA COMPRESSION SELECTED CONSTELLATION

CROSS REFERENCE TO RELATED APPLICATION

This application is related to an application entitled "DATA COMPRESSION WITH ERROR CORRECTION" of Ming-Luh Kao and Jong-Keung Cheng filed of even data herewith. This application is identified by attorney docket number 5173. This application is hereby incorporated by reference herein.

BACKGROUND OF THE INVENTION

1. Field of the Invention

This invention relates generally to the field of data modems. More particularly, this invention relates to a data modem using data compression as a criterion for selection of one of a plurality of constellations for enhanced integrity of data transmission.

2. Background

Data compression has been used by several manufactures of asynchronous data modems to increase the throughput of their modems. It is well known that by proper compression of data to be transmitted, substantial increases in effective transmission speed can be obtained. Unfortunately, not all data can be efficiently compressed. While such devices may often be able to more than double or quadruple the effective data rate, the process is highly data dependent and cannot be absolutely relied upon. Efficient compression is highly dependent upon the inherent redundancy of the data being compressed. Therefore, it is not always possible to depend upon data compression to provide a required increase in transmission throughput.

In U.S. Pat. No. 4,646,061 to Robert Bledsoe, which is assigned to the assignee of the present invention and incorporated herein by reference, a plurality of data compression tables are used to efficiently compress a variety of data types. This particular patent uses variations of Huffman coding to produce efficient compression of a variety of data types by matching the data being compressed to the compression algorithm. Other adaptive schemes are known in the art to allow a greater likelihood of obtaining efficient data compression.

Class 5 of Microcom's ® MNP ™ error-correction protocol incorporates an apparently adaptive form of data compression which is claimed to provide between 1.3 to 1 and 2 to 1 data compression depending upon the data. Typical compression ratios are said to be approximately 1.6 to 1. This data compression is used in a conventional manner to increase the data throughput of the modem. Class 4 of the MNP protocol incorporates Adaptive Packet Assembly ™ which adapts the size of packets transmitted so that when larger numbers of errors are occurring, packet size is reduced to reduce wasted bandwidth when retransmissions are required. Other known types of data compression can frequently yield compression of greater than 4 to 1.

One example of an appropriate algorithm for data compression with the present invention is the "Ziv Lempel" algorithm or modification thereof, available by license from BT Datacom, Herndon, Virginia. This algorithm can be implemented in many cases using an eight bit processor with about 16K of memory.

Each of the compression schemes described above, and others known in the art, enhances data throughput by data compression. It is known to use the compression ratio obtained as a feedback mechanism used to select an efficient compression algorithm. However, none of the known data compression art is yet able to reliably provide a relatively constant and dependable data throughput using data compression while increasing the communication reliability and enhancing throughput. In synchronous data transmission, this level of reliability is highly advantageous.

Data throughput may be enhanced in a variety of ways. Consider for example, a 19,200 BPS data compressing modem which is achieving a compression ratio of 1.25 (often expressed as 1.25 to 1 or 1.25:1). One would naturally expect that a data throughput of 1.25 X 19,200=24,000 BPS would be achieved. However, since the transmission bandwidth of the channel is being pushed to the current technology limits in the case such of high speed modems, a substantial number of retransmissions, retrains, errors and other line impairment related disruptions are typical. Thus, with a poor transmission line that is not able to adequately support the 19,200 BPS transmission rate, the effective throughput can be radically reduced by errors, speed changes, retransmissions, retrains and other overhead so that less than the 19,200 BPS rate is actually achieved. Thus, although data compression can clearly enhance the throughput of a data modem in many instances, there is rarely a guarantee.

Rather than gamble on the ability of the data compression algorithm's ability to provide increased transmission throughput, the present invention utilizes whatever compression is available to enhance the reliability of transmission so that fewer retransmissions, retrains and other throughput reducing occurrences are minimized. Thus, in the above example, the user obtains a substantially greater likelihood of achieving the desired 19,200 BPS throughput even in the face of substantial line impairments and unpredictable compression ratios with use of the present invention.

In addition, the present invention is particularly well suited to use in synchronous data modems, but this is not limiting. The prior compression techniques which are aimed only at enhancing throughput are difficult to utilize in a synchronous network. To use them requires extensive buffering and flow control which is not normally present and which are undesirable in such networks. Providing these additional functions can substantially impact the amount of hardware associated with each modem while still providing no guarantee of increased data throughput. The present invention is well suited to such synchronous networks since the end to end throughput is essentially unaltered with the additional bandwidth obtained by compression utilized to facilitate greater immunity to impairments.

In conventional synchronous data modems, a fixed constellation pattern is utilized for a selected bit rate of transmission. An exception is that during initial startup a training sequence containing multiple sets of constellations are sometimes used.

U.S. Pat. No. 4,780,883 to O'Connor et al., which is assigned to the assignee of the present invention and incorporated by reference herein, describes a method and apparatus for effecting speed changes i a data modem. Speed changes are effected based upon the maximum speed which a channel can support without undue errors and are implemented in part by change in the number of constellation points transmitted. Data compression is not disclosed.

SUMMARY OF THE INVENTION

It is an object of the present invention to provide an improved data modem having enhanced immunity to transmission channel impairments.

It is another object of the present invention to provide a data modem which utilizes data compression to control the population of the symbol constellation so that transmission reliability is enhanced.

It is an advantage of the present invention to provide a synchronous modem which utilizes data compression to provide a greater degree of certainty of throughput.

These and other objects, features and advantages of the invention will become apparent to those skilled in the art upon consideration of the following description.

In one embodiment of the present invention, an improved data modem includes a data compression circuit which compresses incoming data prior to transmission. The compression ratio obtained from the compression process is used to select a constellation for transmission of the data. When higher compression rates are achieved, fewer constellation points (symbols) representing fewer bits per point are transmitted. In this manner, throughput can be held constant while utilizing a more robust constellation which exhibits greater immunity to transmission line impairments. This reduces errors and retransmissions which can ultimately lead to reduction in effective throughput in conventional systems.

BRIEF DESCRIPTION OF THE DRAWINGS

FIG. 1 shows a functional block diagram of a modem transmitter according to the present invention.

FIG. 2 shows a functional block diagram of a modem receiver according to the present invention.

FIG. 3 shows a constellation of all possible points used in a 9600 BPS modem according to one embodiment of the present invention.

FIG. 4 shows which of the constellation points are used when transmitting 16 possible data symbols.

FIG. 5 shows which of the constellation points are used when transmitting 8 possible data symbols.

FIG. 6 shows which of the constellation points are used when transmitting 4 possible data symbols.

FIG. 7 shows which of the constellation points are used when transmitting 2 possible data symbols.

DESCRIPTION OF THE INVENTION

Figure 8:
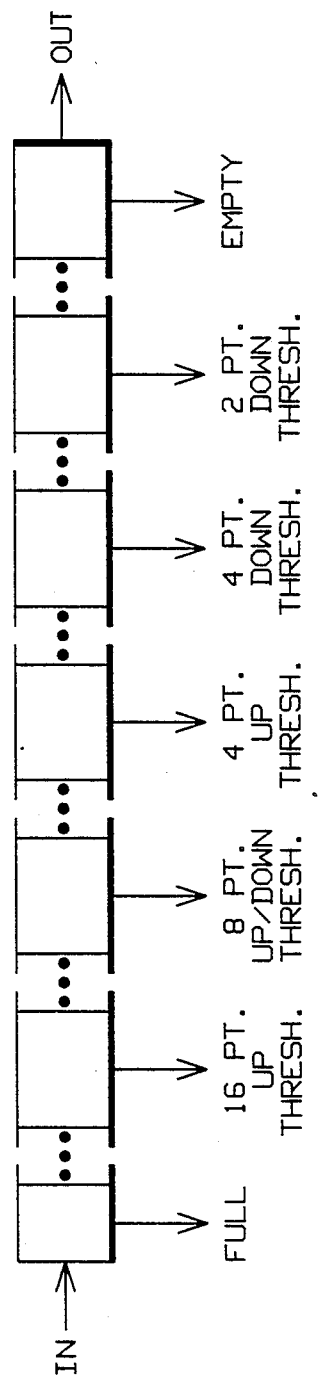
FIG. 8 shows a more detailed illustration of one embodiment of a buffer which provides a measure of compression ratio.

Turning now to the FIGURES and in particular to FIG. 1, a simple 9600 BPS synchronous modem transmitter according to the present invention is shown in functional block diagram form. Of course, the present invention is not limited to the example shown since the present invention may equally well be implemented in coded modems and higher speed modems in a similar manner.

Synchronous data, typically in a serial format such as RS-232, is applied to an input 20 of a data compressor 22 at a constant data rate. (Of course, the present invention may also be practiced in an asynchronous environment if desired with suitable modifications.) Any of a number of known data compression algorithms may be utilized to achieve the desired compression. In the preferred embodiment, the BT Datacom modified Ziv Lempel compression algorithm may be used, but this is not limiting since this field is rapidly advancing and more suitable algorithms may be available. The output of the data compressor provides variable rate compressed data to a buffer 24 which functions on a first-in-first-out (FIFO) basis. The buffer 24 output is scrambled by a scrambled by a scrambler 26 in a conventional manner and then passed to a serial to parallel (S/P) converter 28. The serial to parallel converter 28 provides up to 4 bits of parallel output depending upon the level of compression achieved by compressor 22 (4 bits at 9600 BPS, 3 bits at 7200 BPS, 2 bits at 4800 BPS and 1 bit at 2400 BPS). The parallel output of the S/P 28 is modulated by a modulator 30 to produce preferably quadrature amplitude modulated (QAM) symbols (at 2400 baud rate) which are converted to analog signals by digital to analog converter (D/A) 32. The analog signals from D/A 32 are filtered by a filter 34 whose output 36 is coupled to the transmission channel.

The status of buffer 24, a measurement of how full the buffer is, is provided as a status signal shown at 38 to a speed decision block 40. The status signal may be thought of and interpreted as a measure of the compression ratio of compressor 32 since the buffer will be filled or emptied at a variable rate depending upon the compression ratio being obtained by the compressor 32 in conjunction with the rate of emptying (i.e. the number of bits per transmitted symbol). In this embodiment, although the compression ratio is not actually computed, a measure of the level of compression obtained is nonetheless taken by monitoring the condition of the buffer. In other embodiments, it may be possible or desirable to compute the actual compression ratio by, for example, computing the ratio of the number of input bits to the number of output bits. Other techniques for monitoring the compression ratio or level of compression will occur to those skilled in the art.

When the buffer 24 empties to a predetermined threshold, speed decision block 40 knows that the compressed data may be transmitted using a reduced number of constellation points, speed decision block 40 modifies a clock 44 which is used to clock the scrambler 26 and the S/P 28 to a new rate. Also, the speed decision block 40 signals a constellation selector 46 that a change in constellation is appropriate. Constellation selector 46 then selects an appropriate constellation for use by modulator 30 to and instructs modulator 30 to issue a signal, which is preferably an inband signal, indicating that a constellation change is to be made. The modulator 30 then injects an inband signal and converts immediately thereafter to the newly selected constellation. A similar scenario takes place when the speed decision block 40 detects that a higher number of constellation points are needed. In the preferred embodiment, the inband signal is a single special constellation symbol which can be transmitted so that very little overhead is incurred. That overhead is absorbed by the compression efficiency gained so that there is rarely likely to be a penalty for use of the present invention.

Due to the variable rate of the output of the data compressor 22, it periodically may be required to produce meaningless filler information to effect or maintain synchronization. This is initiated under the control of speed decision block 40 by signaling on a sync fill control line 48. This occurs when the buffer is empty and such is detected by speed decision block 40 which instructs data compressor 22 to generate sync fill data. Any time the buffer empties, sync fill is transmitted.

Turning now to FIG. 2, a block diagram of a modem receiver according to the present invention is shown in functional block diagram form. Data signals from the transmission channel are received at 60 and passed through a low pass or band pass filter 62 prior to conversion to a digital signal by an analog to digital (A/D) converter 64. The digital output of A/D 64 is then processed by demodulator 66 in a conventional manner. The demodulated signal is equalized by a receiver equalizer 68 also in a known manner. The equalized signal from 68 is passed on to a slicer 70. Slicer 70 is used to make decisions about which ot the constellation symbols have been received. Slicer 70 also provides an error signal to equalizer 68 so that equalizer 68 can adapt its equalizer coefficients to provide more accurate equalization of the transmission line characteristics in a conventional manner.

The output of the slicer 70 is decoded in a conventional manner by a decoder 74 the output of which is passed to a parallel to serial (P/S) converter 76. The serial output of P/S 76 is then descrambled by a descrambler 78 and passed on to data expander 80 which performs the opposite function of data compressor 22. The data expander 80 includes a small amount of buffer memory to smooth out the instantaneous variations in the data rate and provide synchronous data output. The output of data expander 80 is then provided at 82. Any fill information inserted by data compressor 22 is detected and stripped by data expander 80.

According to the preferred embodiment, an inband signaling scheme is utilized to effect transition from one constellation to the next. The preferred scheme uses a pair of special constellation vectors which are transmitted to signal either an upward or downward transition in number of constellation points. Normal data is inhibited during transmission of these special vectors. Also according to the present embodiment, the number of constellation points is doubled or halved at each transition as the number of binary digits represented by each vector is increased or decreased respectively by one. Accordingly, the slicer 70 also sends its ouput to a special vector detector 86. When this special vector detector detects receipt of the constellation change vectors, it signals the slicer 70 to switch to a new mode of operation so as to distinguish between the symbols in the new constellation. Vector detector 86 also signals a clock 88, which is used to clock the P/S 76 and the descrambler 78, to switch to a new clock rate so that the data is properly clocked for the new constellation. Other minor incidental changes to operation of the modem may also be effected at this time.

In order to illustrate one embodiment of the present invention, FIG. 3 shows a constellation pattern including all possible points which may be used in a 9600 BPS embodiment of the invention. The 16 possible data points are represented as dots and the two special vectors used for inband signaling are represented by "x" in the figures. This particular constellation is not to be limiting, however, since higher data rates using constellations having even more points may benefit even more by the present invention. Similarly, the present invention may be used with coded modems without departing from the invention. In this embodiment, vector number 18 is transmitted to indicate that the number of constellation points should be increased to the next constellation. Vector number 17 is transmitted to indicate that the number of constellation points should be decreased to the next constellation. In this example, the modem can transmit any of four separate constellations depending upon the compression ratio achieved as described in Table 1.

TABLE 1

| # Constellation Points | Average Compression ratio |
|---|---|
| 16 | 1 to 1 |
| 8 | 4 to 3 |
| 4 | 2 to 1 |
| 2 | 4 to 1 or greater |

FIG. 4 shows the active symbols when the modem is operating with little or no compression. Potentially active symbols are indicated by enclosing the dots and "x" with a circle. In the 9600 BPS embodiment, 16 constellation points, numbered 1-16, are utilized in a conventional manner to transmit data at a 2400 Hz symbol rate. Each constellation symbol represents four bits of data so that the total bit rate is 9600 BPS with no compression. Since this is the most populated constellation for this example, vector number 18 is not needed as it is reserved for indicating that the numer of symbols should be increased.

When the average level of compression obtained allows the modem to support use of a less populated constellation, symbol number 17 is transmitted and the next group of symbols will be from the constellation of FIG. 5. In FIG. 5, as in FIG. 4, the symbols used for representing data are represented as dots surrounded by circles. Both symbols 17 and 18 are used in this constellation to signal decrease and increase in number of symbols respectively. Since this constellation contains fewer symbols than the previous constellation, and enhanced immunity to noise and more reliable slicer operation is obtained.

When the level of compression further justifies the use of an even less populated constellation, symbol number 17 can again be transmitted indicating that the next symbols will be from the constellation of FIG. 6 which contains four possible data simbols and the two special symbols. Once again, symbol 17 signals an incremental decrease in constellation population and 18 signals and incremental increase in constellation population. This constellation is quite robust and can provide very reliable communication even in the presence of substantial line impairments.

When even further compression (4 to 1 and better) is obtained, symbol number 17 can again be transmitted followed by conversion to use of the constellation of FIG. 7. This constellation has only two data points along with the same two constellation change symbols. Since no further reduction in constellation points is possible, symbol number 17 is not active and symbol number 18 is used to indicate that more constellation points are required due to a decrease in compression.

Those skilled in the art will appreciate that other inband or out of band signaling techniques can also be used. For exmple, the location of the special constellation change symbols can be different for each constellation to make it easier for the slicer to detect these special symbols for each particular constellation. For example, in FIG.7, the origin or one of points number 14 or 16 may be easier for the slicer to differentiate from the data points 13 and 15. In other methods, four symbols may be reserved for constellation change signaling. In this variation of a 9600 BPS modem with 4 possible data constellations, each of the four symbols may equate to one of the four constellations so that no intermediate steps are ever necessary to go from one constellation to another. With the example embodiment, the transmission of M consecutive constellation change symbols results in change in number of symbols in the constellation by a factor of $2^M$. For more generalized modem constellations, Table 2 indicates the progression of how the change in average compression level relates to the number of constellation points. As compression technology further improves, higher compression ratios can be readily extraplated.

TABLE 2

| Average Compression Ratio | No. Constellation Points |
|---|---|
| 1:1 | $2^N$ |
| N:N−1 | $2^{N-1}$ |
| N:N−2 | $2^{N-2}$ |
| ... | ... |
| N:N−i | $2^{N-i}$ | where i > N

Turning now to FIG. 8, a more detailed technique for establishing the level of compression from the buffer 24 is shown. The buffer 24 operates as a FIFO and may be implement in any of a number of ways. As shown, data at the input are shifted right to the rightmost available position. Thresholds are established along the FIFO indicate how much to the buffer contains data and relate that information to the compression ratio. In the 9600 BPS example, it is anticipated that for most types of data, a buffer size of approximately 100 bits is adequate. To allow for a level of hysteresis and a margin of error, the thresholds shown in FIG. 8 are estimated in Table 3. Of course, these thresholds are best established and fine tuned on an individual basis depending upon the type of data being compressed, the compression algorithm, the size of the buffer being used and other factors. Thus, the numbers of Table 3 should be viewed as more of a starting point than as an absolute. The percentages represent (the distance from the output of the FIFO)*(100%)/(total buffer size). It is advantageous to have a different threshold for changing from a more populated constellation to a less populated constellation than the threshold for changing from a less populated constellation to a more populated constellation to reduce chatter between modes. Such chatter results in unnecessary overhead since a special vector is transmitted for each mode change.

TABLE 3

| Comp. | No. Constellation Points | Down Thresh. | Normal | Up thresh |
|---|---|---|---|---|
| 1:1 | 16 point | 60% | 90% | N/A |
| 4:3 | 8 point | 30% | 60% | 95% |
| 2:1 | 4 point | 10% | 35% | 60% |
| 4:1 | 2 point | N/A | 5% | 35% |

The values shown in TABLE 3 are to be consiedered as guidelines only and should be adjusted to fit the particular type of data, compression algorithm, buffer size, etc. of the particular system if possible. No attempt has been made to optimize the buffer size or threshold. These values were selected imperically by considering the speed at which the buffer will fill or empty when in each mode. For example, when the present modem with a 100 bit buffer is in the 8 point mode (corresponding to 4:3 compression) but the compressor is compressing at a 2:1 compression ratio, the buffer is emptying at a rate of 1 bit per symbol transmitted (that is the 3 bits per symbol transmitted versus 2 bits per symbol placed in buffer). If the buffer is at 60% (e.g. it has just switched from 16 point mode to 8 point mode), then the buffer will reach the next transition to a lower population constellation in 30 symbols. That is, 1 bit equals one percent of the buffer and in 30 symbols (30%) the threshold to drop to 4 point operation is reached.

Figure 9:
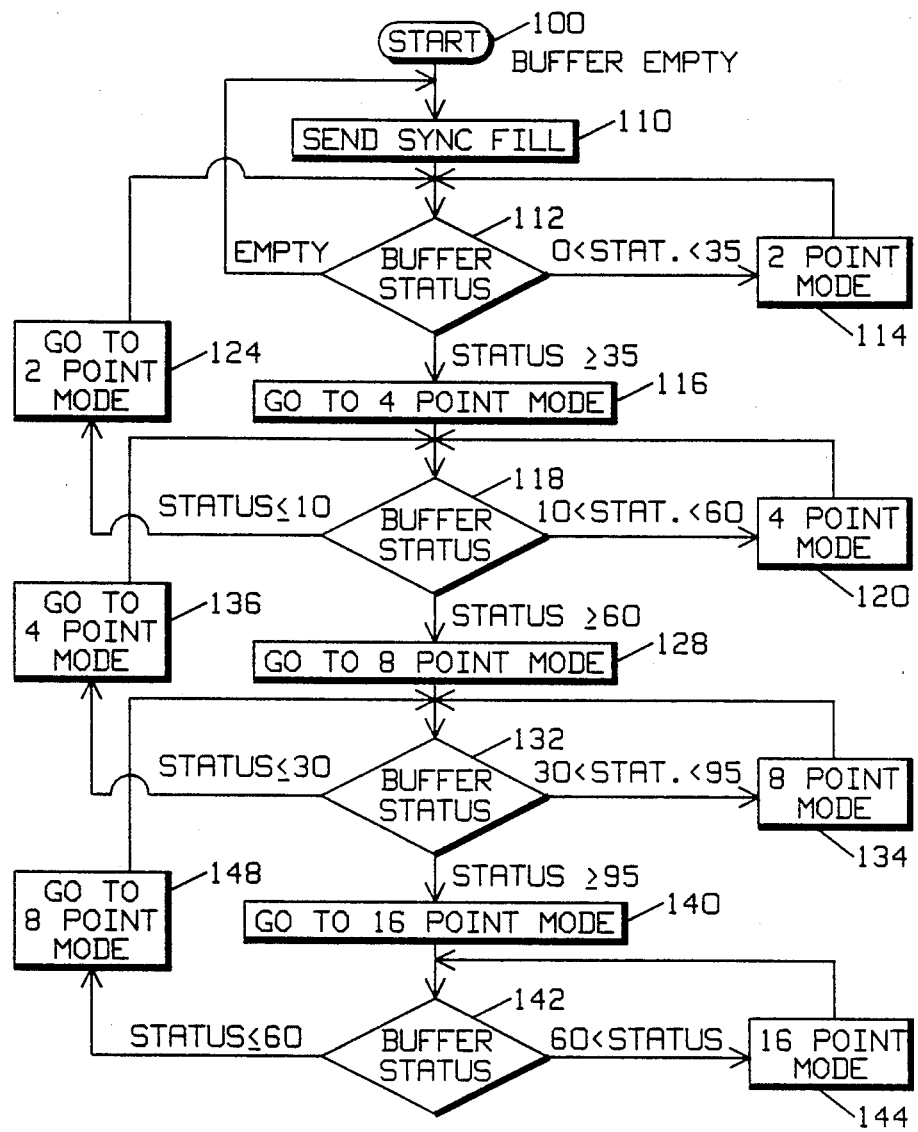
FIG. 9 is a flow chart of the operation of the present invention.

Turning now to FIG. 9, a flow chart of the operation of the present invention using the thresholds of TABLE 3 is shown. The symmetry of the process will be evident to those skilled in the art and can be readily extended to other systems using different thresholds and different operational modes. The process starts at step 100 with the buffer emtpy and the modem operating in the 2 point constellation mode of operation. Control then passes to 110 where sync fill is transmitted as required until actual data begins filling the buffer. The buffer status is checked at step 112 and control returns to 110 as long as the buffer is empty. If the buffer status is not up to 35% full at 112, control passes to 114 where the modem reamins in the 2 point constellation mode of transmission. Control returns to 112 from 114. If the status is greater than or equal to 35% at 112, the modem shifts to 4 point constellation mode at step 116. Control then passes to step 118.

At step 118, the buffer status is again checked. If the buffer status is between 10 and 60%, the modem remains in the 4 point constellation at 120 and control goes back to 118. If the status is less than or equal to 10% at 118, the modem shifts into the 2 point constellation mode at 124 and conatrol goes back to step 112 as previously described. If the status is greater than or equal to 60% full, then control passes from 118 to 128 where the modem shifts into the 8 point mode of operation. In all cases, with regard to description of FIG. 9, a shift of change of mode involves transmission of an appropriate special vector to indicate incr̃ease or decrease in number of constellation symbols, followed immediately by a change to that constellation (and all associated changes required to implement the change in constellation) as previously described.

Control passes from step 128 to step 132 where the buffer status is again checked. If the buffer is between 30 and 95% full, the modem remains in the 8 point constellation mode at 134 and control passes back to 132. If the status at 132 is less than or equal to 30% at 132, the modem shifts to 4 point mode at 136 and control goes back to step 118. If the buffer is greater than or equal to 95% full at 132, the modem shifts into 16 point constellation mode at 140 and control passes to decision 142.

At 142, if the status is greater than 60%, the modem remains in the 16 point constellation mode of operation at 144 and control is returned to 142. If the status is less than or equal to 60% at 142, the modem shifts to the 8 point mode of operation at step 148 after which control reverts back to step 132. Those skilled in the art will appreciate that the present process may be readily adapted to numerous variations and is equally applicable to higher speed modems using more complex and more highly populated constellations. Similiarly, the threshold percentages are intended to be illustrative only and are subject to substantial variation in practice.

In other variations of the present invention, those skilled in the art will appreciated that due to variations in the average energy present in the varying constellations, automatic gain control circuitry may require adjustment with each change in constellation. Similarly, the speed of adjustment of adaptive equalizers may be advantageously varied according to the relative likelihood of error for each constellation used. Other design considerations and optimizations may occur to those skilled in the art.

The present invention, while preferably implemented using a programmed processor such as a microprocessor, may equally well be implemented using custom or semicustom circuits or discrete equivalents without departing from the present invention.

Thus it is apparent that in accordance with the present invention, a method that fully satisfies the aims, advantages and objectives is set forth above. While the invention has been described in conjunction with specific embodiments, it is evident that many alternatives, modifications and variations will become apparent to those silled in the art upon consideration of the forgoing description. Accordingly, it is intended that the present invention embrace all such alternatives, modifications and variations as fall within the spirit and broad scope of the appended claims.

What is claimed is:

1. A transmitter/modulator, comprising in combination:
   transmitting means for transmitting information over a transmission line, said information being represented by points in one of a plurality of selectable constellations, each said selectable constellation having a different number of points;
   comprising means for compressing information to be transmitted by said transmitting means; and
   selecting means, responsive to said compressing means, for selecting one of said plurality of constellations based upon a level of compression obtained by said compressing means.

2. The apparatus of claim 1, wherein the number of points in said selected constellation in inversely to a compression ratio obtained by said compression means so that a constellation with fewer points is selected when higher levels of compression are obtained.

3. The apparatus of claim 1, wherein said plurality of selectable constellations have varying degrees of noise immunity, and wherein said selecting means selects a constellation whose noise immunity is related to the level of compression so that a constellation with higher noise immunity is selected when higher levels of compression are obtained.

4. The apparatus of claim 1, wherein saaid constellation is selected by said selecting means based upon the following table:

| Average Compression Ratio | No. Constellation Points |
|---|---|
| 1:1 | $2^N$ |
| N:N-1 | $2^{N-1}$ |
| N:N-2 | $2^{N-2}$ |
| ... | ... |
| N:N-i | $2^{N-i}$ | where N is a positive integer greater than a positive integer i.

5. The apparatus of claim 1, wherein said compressing means includes means for compressing said information using a Ziv Lempel algorithm.

6. The apparatus of claim 1, further comprising inband signaling means for transmitting a signal indicative of a change in constellation.

7. The apparatus of claim 6, wherein said inband signaling means includes means for transmitting a predetermined symbol which does not form a part of any of said constellations used for transmission of data to signal said change in constellations.

8. The apparatus of claim 1, further comprising means for measuring a level of compression achieved by said compressing means.

9. The apparatus of claim 1, wherein said selecting means includes buffering means for buffering data compressed by said compressing means and monitoring means for detecting the amount of compressed data in said buffering means as a measure of said level of comrpession.

10. A method of enhancing the error performance of a data transmitter/modulator, comprising the steps of:
    receiving data to be transmitted by said modem;
    compressing said data;
    determining whether said data is being compressed at a compression level greater than a predetermined threshold; and
    changing a constellation used for transmission to a constellation having fewer points in the event said compression level exceeds said predetermined threshold.

11. The method of claim 10, further comprising the step of transmitting and inband signal to effect change of said constellation.

12. The method of claim 10, further comprising the step of selecting a constellation having a greater number of points in the event said compression level falls below predetermined compression limit.

13. In a data transmitter/modulatr, a method of selecting between a plurality of transmission modes, comprising the steps of:
    receiving data to be transmitted by said transmitter/modulator, said transmitter/modulator being capable of tramsmitting said data at a predetermined data rate;
    compressing said data;
    determining a compression level obtained in said compressing step; and
    selecting a transmission mode which utilizes the bandwidth made available by said compressing step to enhance the error performance while maintaining a data throughput which is at least as great as said predetermined data rate.

14. The method of claim 13, wherein said transmission modes are characterized by utilizing a predetermined number of QAM constellation points.

15. The method of claim 13, further comprising selecting one of said plurality of transmission modes by comparing said compression level with a predetermined threshold.

16. A method of enhacing the error performance of a transmiter/modulator, comprising the steps of:
    freeing bandwidth by compressing information to be transmitted by said transmitter/modulator; and
    utilizing said free bandwidth to enhance the reliability of transmission by said transmitter/modulator by utilizing a more reliable transmission method, said transmission method being selected depending upon the degree of compression obtained.

17. The method of claim 16, wherein said reliability is enhanced by transmitting a constellation having fewer points than would be needed to transmit the same information without compression at the same rate.

18. A receiver/demodulator, comprising in combination:

receiving means for receiving a plurality of synchronous transmitted data symbols, said transmitted data symbols each being part of one of a plurality of constellations of symbols;

a slicer for determining which of said transmitted data symbols from a particular one of said plurality of constellations are received;

detecting means for detecting and embedded constellation change symbol within said plurality of transmitted data symbols;

control means responsive to said detecting means for modifying operation of said slicer so that received data symbols are sliced according to a different one of said plurality of constellations;

decoding means for decoding each of said data symbols into compressed data symbols; and adaptive data expanding means for expanding said compressed data symbols.

* * * * *